(12) United States Patent
Suto et al.

(10) Patent No.: US 10,811,037 B2
(45) Date of Patent: Oct. 20, 2020

(54) MAGNETIC HEAD WITH CONDUCTIVE LAYER CONFIGURATIONS BETWEEN MAGNETIC POLE AND SHIELD AND MAGNETIC RECORDING AND REPRODUCING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hirofumi Suto, Tokyo (JP); Naoyuki Narita, Chiba (JP); Tazumi Nagasawa, Kanagawa (JP); Masayuki Takagishi, Tokyo (JP); Tomoyuki Maeda, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/299,392

(22) Filed: Mar. 12, 2019

(65) Prior Publication Data
US 2020/0082845 A1 Mar. 12, 2020

(30) Foreign Application Priority Data
Sep. 11, 2018 (JP) .................................. 2018-169851

(51) Int. Cl.
*G11B 5/235* (2006.01)
*G11B 5/31* (2006.01)
(Continued)

(52) U.S. Cl.
CPC .......... *G11B 5/3143* (2013.01); *G11B 5/1278* (2013.01); *G11B 5/235* (2013.01); *G11B 2005/0024* (2013.01)

(58) Field of Classification Search
None
See application file for complete search history.

(56) References Cited

U.S. PATENT DOCUMENTS

| 2011/0242701 A1* | 10/2011 | Ohtake et al. | G11B 5/3146 360/119.03 |
| 2013/0050875 A1* | 2/2013 | Yamada et al. | G11B 5/1278 360/125.3 |

(Continued)

FOREIGN PATENT DOCUMENTS

JP 2014-130672 7/2014

*Primary Examiner* — Craig A. Renner
(74) *Attorney, Agent, or Firm* — Finnegan, Henderson, Farabow, Garrett & Dunner, L.L.P.

(57) ABSTRACT

According to one embodiment, a magnetic head includes a magnetic pole, a first shield, a magnetic layer, a first conductive layer, and a second conductive layer. The magnetic layer is provided between the magnetic pole and the first shield. The first conductive layer includes at least one of Cu, Ag, Au, Al and Cr, and is provided between the magnetic pole and the first shield. A direction from the first conductive layer toward the magnetic layer crosses a first direction from the magnetic pole toward the first shield. A second conductive layer includes at least one of Ta, Pt, W, Ru, Mo, Ir, Rh, and Pd and is provided at one of a first position or a second position. The first position is between the first conductive layer and the first shield. The second position is between the magnetic pole and the first conductive layer.

19 Claims, 11 Drawing Sheets

(51) Int. Cl.
    *G11B 5/127*     (2006.01)
    *G11B 5/00*     (2006.01)

(56) References Cited

U.S. PATENT DOCUMENTS

| | | | |
|---|---|---|---|
| 2013/0057983 A1* | 3/2013 | Tanabe et al. | G11B 5/3146 360/110 |
| 2014/0146420 A1 | 5/2014 | Shimizu et al. | |
| 2015/0015992 A1* | 1/2015 | Funayanna | G11B 5/235 360/119.04 |
| 2016/0180867 A1* | 6/2016 | Takagishi et al. | G11B 5/314 360/123.01 |
| 2018/0204589 A1* | 7/2018 | Suto et al. | G11B 5/3146 |
| 2019/0088275 A1 | 3/2019 | Narita et al. | |

* cited by examiner

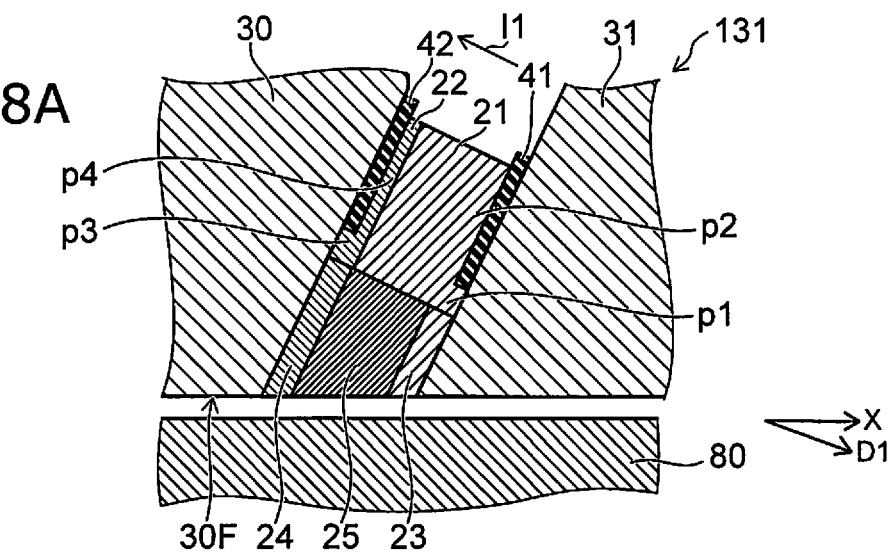
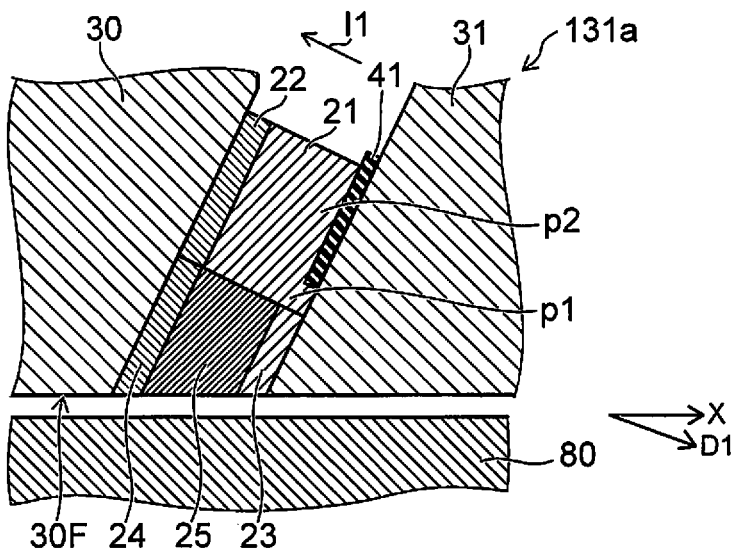
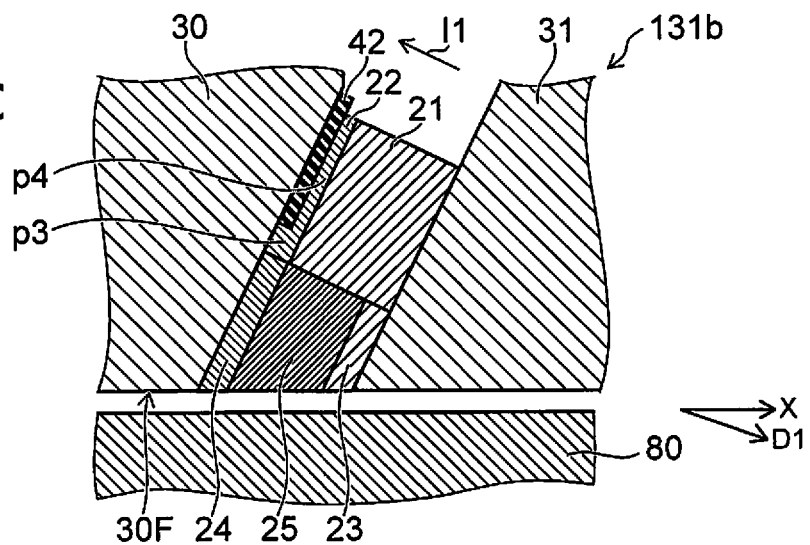

MAGNETIC HEAD WITH CONDUCTIVE LAYER CONFIGURATIONS BETWEEN MAGNETIC POLE AND SHIELD AND MAGNETIC RECORDING AND REPRODUCING DEVICE

CROSS-REFERENCE TO RELATED APPLICATIONS

This application is based upon and claims the benefit of priority from Japanese Patent Application No. 2018-169851, filed on Sep. 11, 2018; the entire contents of which are incorporated herein by reference.

FIELD

Embodiments described herein relate generally to a magnetic head and a magnetic recording and a reproducing device.

BACKGROUND

Information is recorded in a magnetic storage medium such as a HDD (Hard Disk Drive) or the like using a magnetic head. It is desirable to increase the recording density of the magnetic head and the magnetic recording and reproducing device.

BRIEF DESCRIPTION OF THE DRAWINGS

FIG. 8A to FIG. 8C are schematic cross-sectional views illustrating magnetic heads according to the first embodiment;

DETAILED DESCRIPTION

Figure 1A:
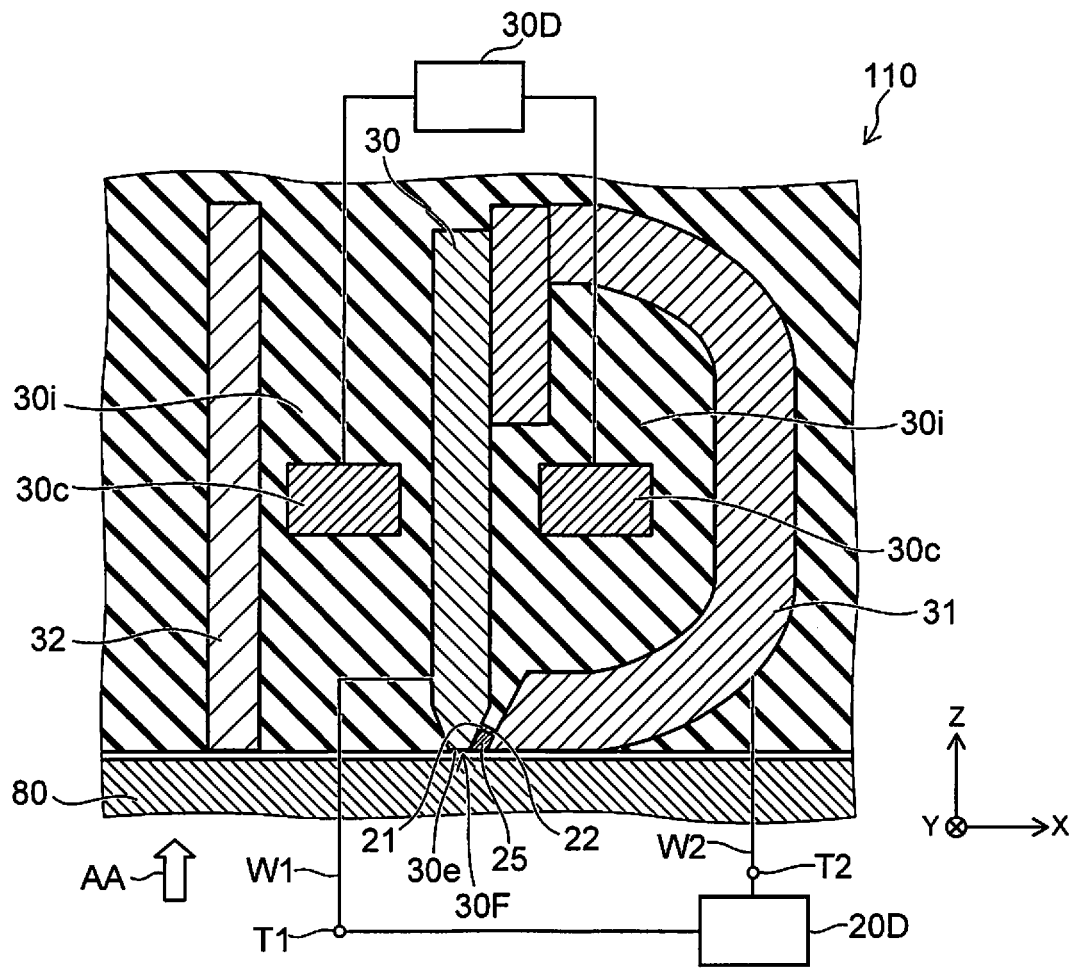
FIG. 1A and FIG. 1B are schematic cross-sectional views illustrating a magnetic head according to a first embodiment.

According to one embodiment, a magnetic head includes a magnetic pole, a first shield, a magnetic layer, a first conductive layer, and a second conductive layer. The magnetic layer is provided between the magnetic pole and the first shield. The first conductive layer includes at least one selected from the group consisting of Cu, Ag, Au, Al and Cr, and is provided between the magnetic pole and the first shield. A direction from the first conductive layer toward the magnetic layer crosses a first direction from the magnetic pole toward the first shield. A second conductive layer includes at least one selected from the group consisting of Ta, Pt, W, Ru, Mo, Ir, Rh, and Pd and is provided at one of a first position or a second position. The first position is between the first conductive layer and the first shield. The second position is between the magnetic pole and the first conductive layer.

According to another embodiment, a magnetic recording and reproducing device includes the magnetic head recited above, a magnetic recording medium, and a first electrical circuit. Information is recorded in the magnetic recording medium by the magnetic head. The first electrical circuit is configured to supply a current between the magnetic pole and the first shield.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
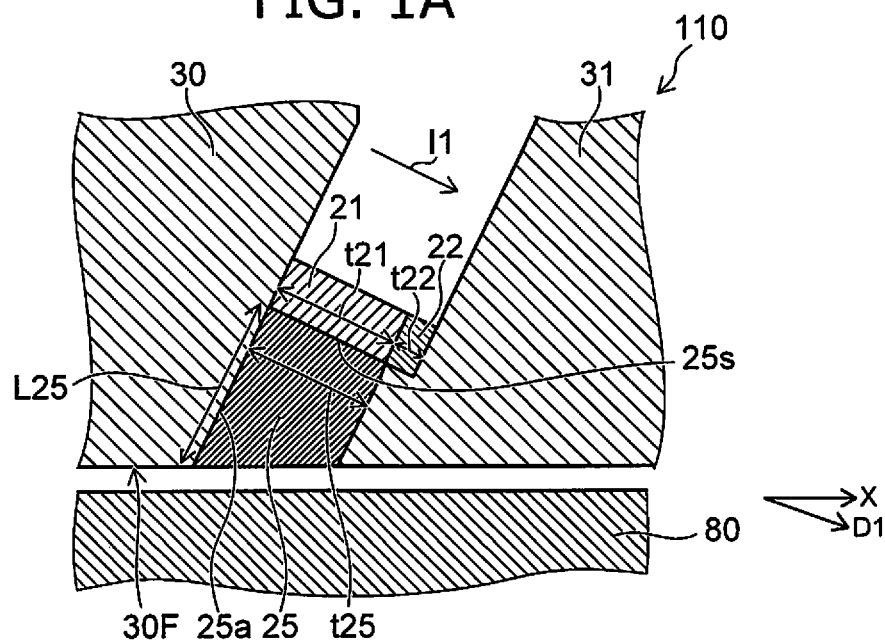

FIG. 1A and FIG. 1B are schematic cross-sectional views illustrating a magnetic head according to a first embodiment.

FIG. 1B is an enlarged view of a portion of FIG. 1A.

As shown in FIG. 1A, the magnetic head 110 according to the embodiment includes a magnetic pole 30, a first shield 31, a magnetic layer 25, a first conductive layer 21, and a second conductive layer 22. A second shield 32 and a coil 30c are further provided in the example.

The magnetic pole 30 is positioned between the first shield 31 and the second shield 32. For example, at least a portion of the coil 30c is positioned between the magnetic pole 30 and the first shield 31. In the example, a portion of the coil 30c is positioned between the magnetic pole 30 and the second shield 32.

A recording electrical circuit (a second electrical circuit 30D) is electrically connected to the coil 30c. A recording current is supplied from the recording electrical circuit to the coil 30c. A magnetic field (a recording magnetic field) that corresponds to the recording current is generated from the magnetic pole 30. The recording magnetic field is applied to a magnetic recording medium 80; and information is recorded in the magnetic recording medium 80. Thus, the recording electrical circuit (the second electrical circuit 30D) is configured to supply, to the coil 30c, a current (a recording current) corresponding to the information to be recorded.

As shown in FIG. 1B, the magnetic layer 25 is provided between the magnetic pole 30 and the first shield 31. The first conductive layer 21 is provided between the magnetic pole 30 and the first shield 31.

In the example, the second conductive layer 22 is provided between the first conductive layer 21 and the first shield 31. As described below, the positions of the first conductive layer 21 and the second conductive layer 22 may be interchanged. The second conductive layer 22 is provided at one of a first position between the first conductive layer 21 and the first shield 31 or a second position between the magnetic pole 30 and the first conductive layer 21. In the example of FIG. 1B, the second conductive layer 22 is provided at the first position.

The direction from the magnetic pole 30 toward the first shield 31 is taken as a first direction D1. The direction from the first conductive layer 21 toward the magnetic layer 25 crosses the first direction D1.

In the example, the second conductive layer 22 overlaps a portion (a protrusion) of the first shield 31 in the direction crossing the first direction D1. As described below, the second conductive layer 22 may overlap the magnetic layer 25 in the direction crossing the first direction D1.

The first conductive layer 21 includes at least one selected from the group consisting of Cu, Ag, Au, Al and Cr.

The second conductive layer 22 includes at least one selected from the group consisting of Ta, Pt, W, Ru, Mo, Ir, Rh, and Pd.

In one example, the first conductive layer 21 includes Cu; and the second conductive layer 22 includes Ta.

The first conductive layer 21 and the second conductive layer 22 are nonmagnetic. For example, the first conductive layer 21 maintains the spin polarization of the electrons. For example, the second conductive layer 22 relaxes the spin polarization of the electrons.

For example, the first conductive layer 21 contacts the magnetic layer 25. For example, the second conductive layer 22 contacts the first conductive layer 21.

A thickness t21 (the length) along the first direction D1 of the first conductive layer 21 is, for example, not less than 10 nm and not more than 30 nm. A thickness t22 (the length) along the first direction D1 of the second conductive layer 22 is, for example, not less than 0.1 nm and not more than 10 nm.

In the example shown in FIG. 1B, the thickness t21 is thicker than the thickness t22.

The first conductive layer 21 opposes a side surface 25s of the magnetic layer 25. A magnetic effect is generated between the first conductive layer 21 and the side surface 25s of the magnetic layer 25. The magnetic effect is, for example, torque based on the accumulation of spin. For example, by setting the side surface 25s of the magnetic layer 25 to be relatively large, the magnetic effect is generated easily. Examples of the magnetic effect are described below.

As shown in FIG. 1B, the magnetic layer 25 has a first surface 25a on the magnetic pole 30 side. The size of the side surface 25s may have a value relatively near the size of the first surface 25a. For example, a thickness t25 along the first direction D1 of the magnetic layer 25 may be not less than 0.2 times and not more than 5 times the length (e.g., a length L25 shown in FIG. 1B) of the first surface 25a in one direction along the first surface 25a. The thickness t25 corresponds to one length of the side surface 25s. The length L25 may be, for example, the length along any direction perpendicular to the first direction D1.

As shown in FIG. 1A, for example, an insulating portion 30i is provided around the magnetic pole 30, the first shield 31, the second shield 32, the coil 30c, the magnetic layer 25, the first conductive layer 21, and the second conductive layer 22. The insulating portion 30i is not illustrated in FIG. 1B.

The magnetic pole 30 is, for example, a major magnetic pole. A magnetic pole surface 30F is provided at an end portion 30e of the magnetic pole 30. For example, the magnetic pole surface 30F is aligned with the ABS (Air Bearing Surface) of the magnetic head 110. The magnetic pole surface 30F opposes the magnetic recording medium 80.

A direction perpendicular to the magnetic pole surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is the cross-track direction.

For example, the magnetic pole 30 is separated from the first shield 31 along the X-axis direction at the vicinity of the magnetic pole surface 30F. For example, the second shield 32 is separated from the magnetic pole 30 along the X-axis direction at the vicinity of the magnetic pole surface 30F. The magnetic head 110 and the magnetic recording medium 80 move relatively substantially along the X-axis direction. Thereby, the information is recorded at any position of the magnetic recording medium 80.

For example, the first shield 31 corresponds to a "trailing shield." For example, the second shield 32 corresponds to a "leading shield." The first shield 31 is, for example, an auxiliary magnetic pole. The first shield 31 can form a magnetic core with the magnetic pole 30. For example, an additional shield such as a side shield (not illustrated), etc., may be provided.

In the example shown in FIG. 1A and FIG. 1B, the first direction D1 is tilted with respect to the X-Y plane.

As shown in FIG. 1B, a first current I1 flows in the first conductive layer 21 and the second conductive layer 22. In the example shown in FIG. 1B, the first current I1 has the orientation from the magnetic pole 30 toward the first shield 31 (the orientation from the first conductive layer 21 toward the second conductive layer 22). In another example as described below, the orientation of the first current I1 may be the orientation from the first shield 31 toward the magnetic pole 30.

For example, the first conductive layer 21 may be electrically connected to the magnetic pole 30. The second conductive layer 22 may be electrically connected to the first shield 31. In such a case, the first current I1 recited above may be supplied via the magnetic pole 30 and the first shield 31.

A first interconnect W1 and a second interconnect W2 may be provided as shown in FIG. 1A. The first interconnect W1 is electrically connected to the magnetic pole 30. The second interconnect W2 is electrically connected to the first shield 31. A first terminal T1 and a second terminal T2 may be provided. The first terminal T1 is electrically connected to the magnetic pole 30 via the first interconnect W1. The second terminal T2 is electrically connected to the first shield 31 via the second interconnect W2.

For example, the first current I1 recited above is supplied from a first electrical circuit 20D (referring to FIG. 1A). For example, the first electrical circuit 20D is configured to supply the first current I1 to the magnetic pole 30 and the first shield 31 via the first terminal T1, the first interconnect W1, the second interconnect W2, and the second terminal T2.

In the embodiment, for example, spin is caused to accumulate at the interface between the first conductive layer 21 and the magnetic pole 30 and the interface between the second conductive layer 22 and the first shield 31 by causing the first current I1 to flow in the first conductive layer 21 and the second conductive layer 22. The spin is transferred (e.g., diffused) to the magnetic layer 25; and the orientation of the magnetization of the magnetic layer 25 can be reversed with respect to the magnetic field emitted from the magnetic pole 30. The spin acts via the side surface 25s of the magnetic layer 25.

Figure 2:
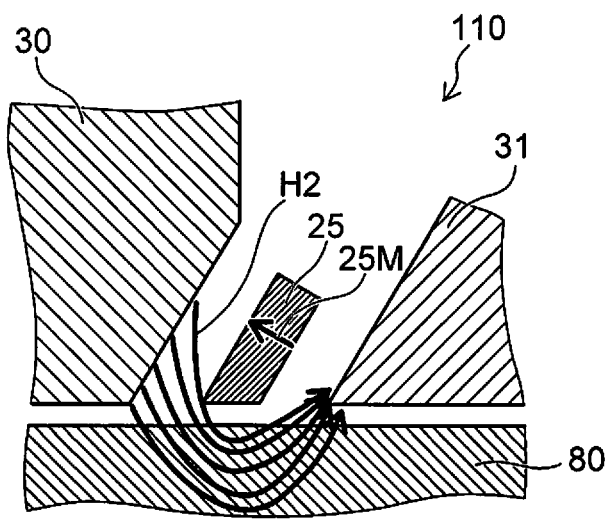
FIG. 2 is a schematic cross-sectional view illustrating an operation of the magnetic head according to the first embodiment.

FIG. 2 is a schematic cross-sectional view illustrating an operation of the magnetic head according to the first embodiment.

In FIG. 2, the magnetic pole 30, the first shield 31, and the magnetic layer 25 are illustrated; and the other members (the first conductive layer 21, the second conductive layer 22, etc.) are not illustrated.

The magnetic layer 25 has a magnetization 25M. A magnetic field H2 (a recording magnetic field) is generated from the magnetic pole 30. At least a portion of the magnetic field H2 becomes the recording magnetic field. If the magnetization 25M of the magnetic layer 25 is not reversed as recited above, the magnetic field H2 enters the magnetic layer 25. On the other hand, as shown in FIG. 2, the magnetic field H2 is not oriented easily toward the magnetic layer 25 in the case where a current is supplied to the first conductive layer 21 and the second conductive layer 22, the spin diffuses into the magnetic layer 25, and the orientation of the magnetization 25M of the magnetic layer 25 reverses with respect to the magnetic field H2. Thereby, the magnetic field H2 is oriented toward the magnetic recording medium 80. Much of the magnetic field H2 passes through the magnetic recording medium 80 as the recording magnetic field and enters the first shield 31. Therefore, much of the magnetic field H2 (the recording magnetic field) is easily applied to the magnetic recording medium 80. The magnetic field H2 is applied effectively to the magnetic recording medium 80 even when the write gap is reduced.

In the embodiment, even when the write gap is reduced, the magnetic field H2 that is emitted from the magnetic pole 30 is suppressed from being oriented directly toward the first shield 31 via the magnetic layer 25. As a result, much of the magnetic field H2 emitted from the magnetic pole 30 is oriented toward the magnetic recording medium 80; and the recording magnetic field is applied effectively to the magnetic recording medium 80. The recording density can be increased thereby.

The magnetization 25M of the magnetic layer 25 reverses when the orientation of the first current I1 is a prescribed orientation. The orientation of the first current I1 for the reversal is dependent on the materials of the first conductive layer 21 and the second conductive layer 22. For example, the magnetization 25M of the magnetic layer 25 reverses when the first current I1 flows from the first conductive layer 21 toward the second conductive layer 22 in the case where the first conductive layer 21 includes a material that maintains the spin polarization, and the second conductive layer 22 includes a material that relaxes the spin polarization of the electrons. An example of one such material corresponds to Cu, Ag, Au, Al, Cr etc. An example of the other material corresponds to Ta, Pt, W, Ru, Mo, Ir, Rh, Pd, etc.

As recited above, the magnetization 25M of the magnetic layer 25 reverses due to the first current IL Because the magnetic pole 30, the magnetic layer 25, and the first shield 31 are stacked, the electrical resistance of the stacked structure of these components may change due to the reversal of the magnetization 25M of the magnetic layer 25.

For example, the following occurs in the case where the magnetic layer 25 is electrically connected to the magnetic pole 30 and the first shield 31. The electrical resistance when the recording current flows in the coil 30c and a current flows from the magnetic pole 30 toward the first shield 31 may be different from the electrical resistance when the recording current flows in the coil 30c and a current flows from the first shield 31 toward the magnetic pole 30. Information relating to the existence or absence of the reversal of the magnetization 25M may be obtained from the electrical resistance difference. For example, the electrical resistance when the recording current flows in the coil 30c and the first current I1 flows from the magnetic pole 30 toward the first shield 31 may be different from the electrical resistance when the recording current flows in the coil 30c and a current that is smaller than the first current I1 flows between the first shield 31 and the magnetic pole 30.

Examples of various magnetic heads according to the embodiment will now be described. Configurations that are different from the magnetic head 110 are described.

Figure 3:
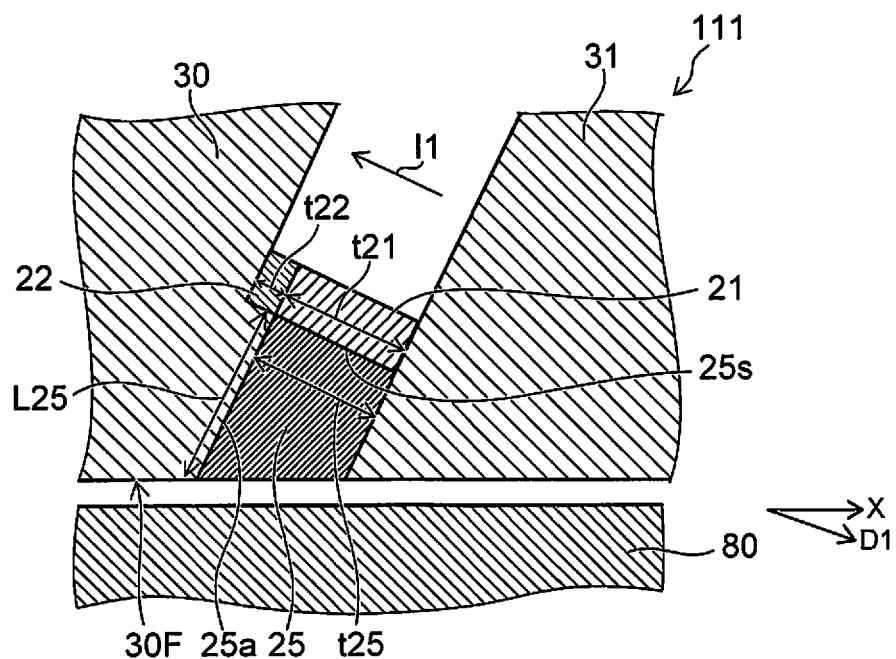
FIG. 3 is a schematic cross-sectional view illustrating a magnetic head according to the first embodiment.

FIG. 3 is a schematic cross-sectional view illustrating a magnetic head according to the first embodiment.

In the magnetic head 111 according to the embodiment as shown in FIG. 3, the second conductive layer 22 is provided between the magnetic pole 30 and the magnetic layer 25 (the second position). In such a case as well, the first current I1 has the orientation from the first conductive layer 21 toward the second conductive layer 22. The first current I1 has the orientation from the first shield 31 toward the magnetic pole 30. The magnetization 25M of the magnetic layer 25 reverses with respect to the magnetic field H2 from the magnetic pole 30 (referring to FIG. 2) when such a first current I1 flows. In such a case as well, the recording magnetic field is applied effectively to the magnetic recording medium 80. The recording density can be increased thereby.

Figure 4A:
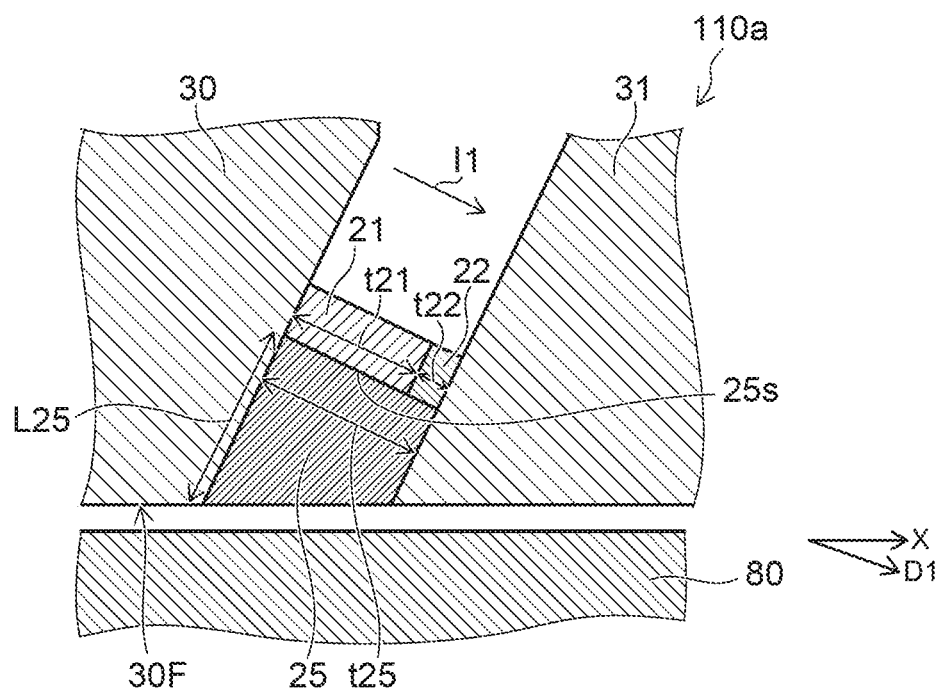
FIG. 4A and FIG. 4B are schematic cross-sectional views illustrating magnetic heads according to the first embodiment.
Figure 4B:
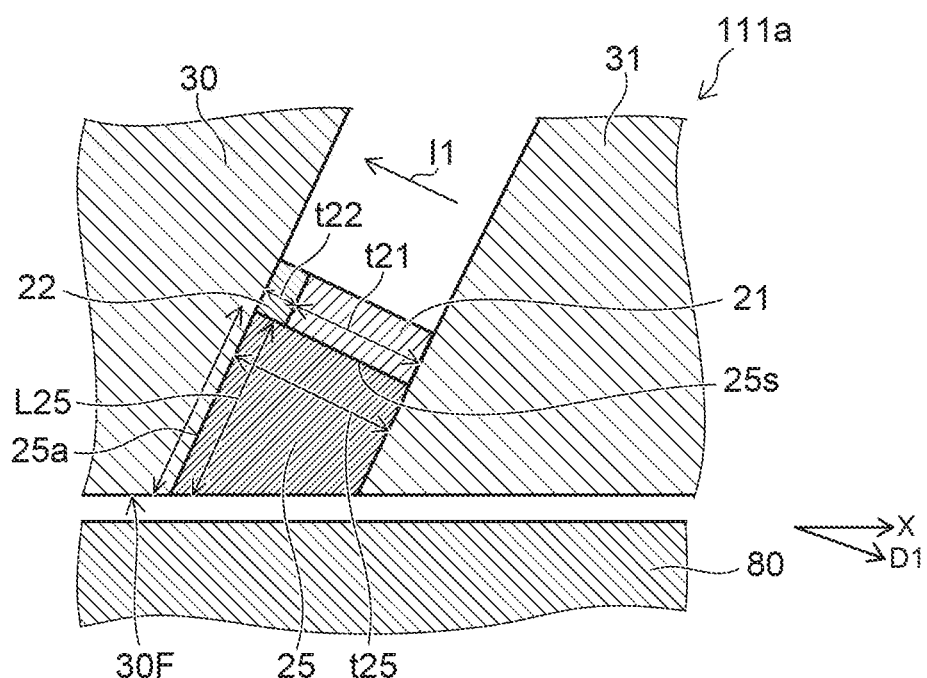

FIG. 4A and FIG. 4B are schematic cross-sectional views illustrating magnetic heads according to the first embodiment.

In magnetic heads 110a and 111a as shown in FIG. 4A and FIG. 4B, the second conductive layer 22 overlaps the magnetic layer 25 in a direction crossing the first direction D1. Otherwise, the configurations of the magnetic heads 110a and 111a are respectively the same as the configurations of the magnetic heads 110 and 111. In the magnetic heads 110a and 111a as well, the recording magnetic field is applied effectively to the magnetic recording medium 80. The recording density can be increased thereby.

Figure 5:
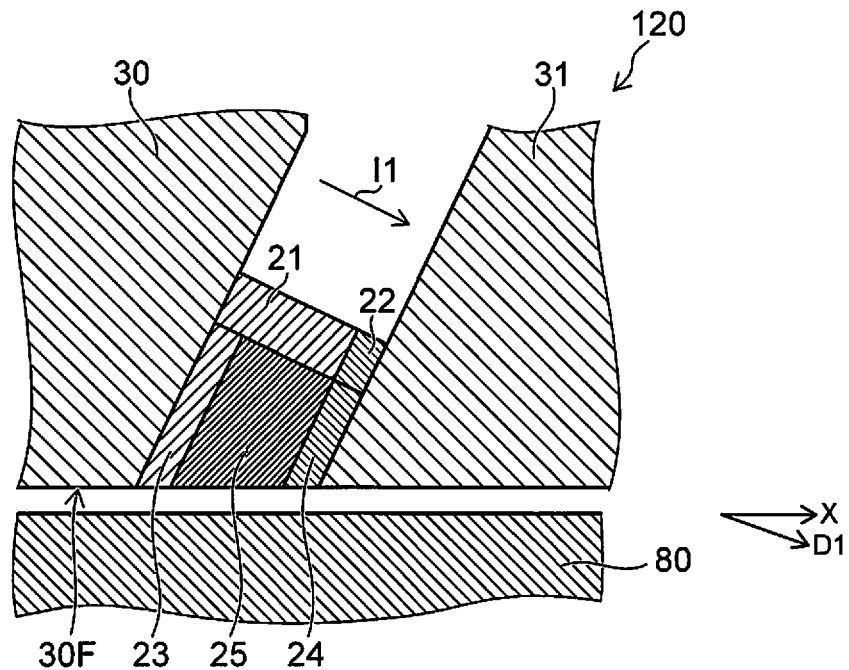
FIG. 5 is a schematic cross-sectional view illustrating a magnetic head according to the first embodiment.

FIG. 5 is a schematic cross-sectional view illustrating a magnetic head according to the first embodiment.

As shown in FIG. 5, the magnetic head 120 according to the embodiment further includes a third conductive layer 23 and a fourth conductive layer 24 in addition to the magnetic pole 30, the first shield 31, the magnetic layer 25, the first conductive layer 21, and the second conductive layer 22.

In the example, the second conductive layer 22 is provided at the first position.

The third conductive layer 23 is provided between the magnetic pole 30 and the magnetic layer 25. The fourth conductive layer 24 is provided between the magnetic layer 25 and the first shield 31. The third conductive layer 23 and the fourth conductive layer 24 are nonmagnetic.

The third conductive layer 23 includes at least one selected from the group consisting of Cu, Ag, Au, Al and Cr. The fourth conductive layer 24 includes at least one selected from the group consisting of Ta, Pt, W, Ru, Mo, Ir, Rh, and Pd. For example, the third conductive layer 23 may include the same material as the material included in the first conductive layer 21. For example, the fourth conductive layer 24 may include the same material as the material included in the second conductive layer 22.

The first current I1 has the orientation from the first conductive layer 21 toward the second conductive layer 22. The first current I1 has the orientation from the third conductive layer 23 toward the fourth conductive layer 24.

Due to such a first current I1, the magnetization 25M of the magnetic layer 25 is reversed more easily with respect to the magnetic field H2 from the magnetic pole 30 by the effect from the third conductive layer 23 and the fourth conductive layer 24.

The recording magnetic field is applied more effectively to the magnetic recording medium 80. The recording density can be increased.

In the example of the magnetic head 120, for example, the third conductive layer 23 contacts the magnetic pole 30 and the magnetic layer 25. The fourth conductive layer 24 contacts the magnetic layer 25 and the first shield 31.

Figure 6:
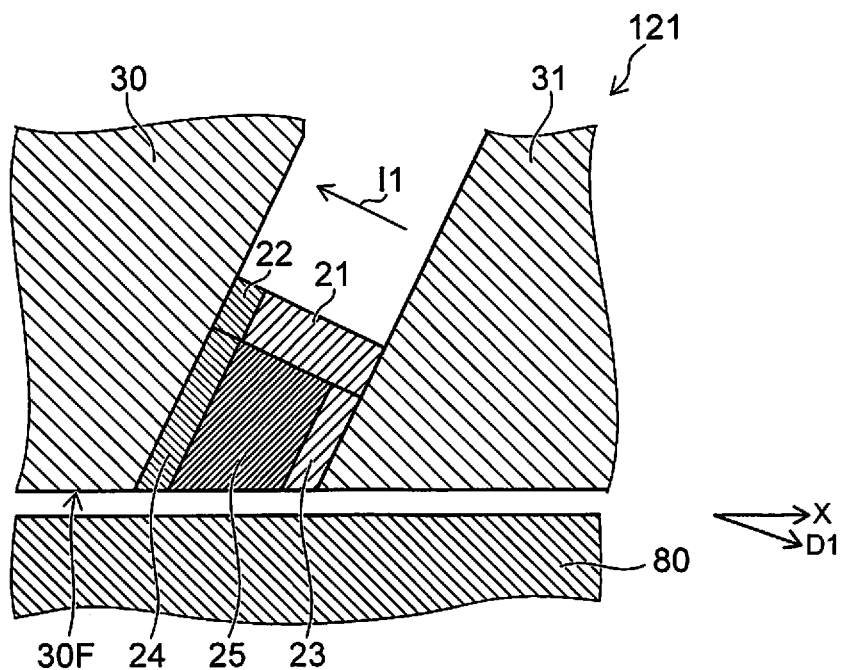
FIG. 6 is a schematic cross-sectional view illustrating a magnetic head according to the first embodiment.

FIG. 6 is a schematic cross-sectional view illustrating a magnetic head according to the first embodiment.

As shown in FIG. 6, the magnetic head 121 according to the embodiment further includes the third conductive layer 23 and the fourth conductive layer 24 in addition to the magnetic pole 30, the first shield 31, the magnetic layer 25, the first conductive layer 21, and the second conductive layer 22.

In the example, the second conductive layer 22 is provided at the second position.

The third conductive layer 23 is provided between the magnetic layer 25 and the first shield 31. The fourth conductive layer 24 is provided between the magnetic pole 30 and the magnetic layer 25. The third conductive layer 23 and the fourth conductive layer 24 are nonmagnetic.

The third conductive layer 23 includes at least one selected from the group consisting of Cu, Ag, Au, Al and Cr. The fourth conductive layer 24 includes at least one selected from the group consisting of Ta, Pt, W, Ru, Mo, Ir, Rh, and Pd.

In such a case as well, the first current I1 has the orientation from the first conductive layer 21 toward the second conductive layer 22. The first current I1 has the orientation from the third conductive layer 23 toward the fourth conductive layer 24.

Due to such a first current I1, the magnetization 25M of the magnetic layer 25 is reversed more easily with respect to the magnetic field H2 from the magnetic pole 30 due to the effect from the third conductive layer 23 and the fourth conductive layer 24.

For example, the third conductive layer 23 contacts the magnetic layer 25 and the first shield 31. The fourth conductive layer 24 contacts the magnetic pole 30 and the magnetic layer 25.

Figure 7A:
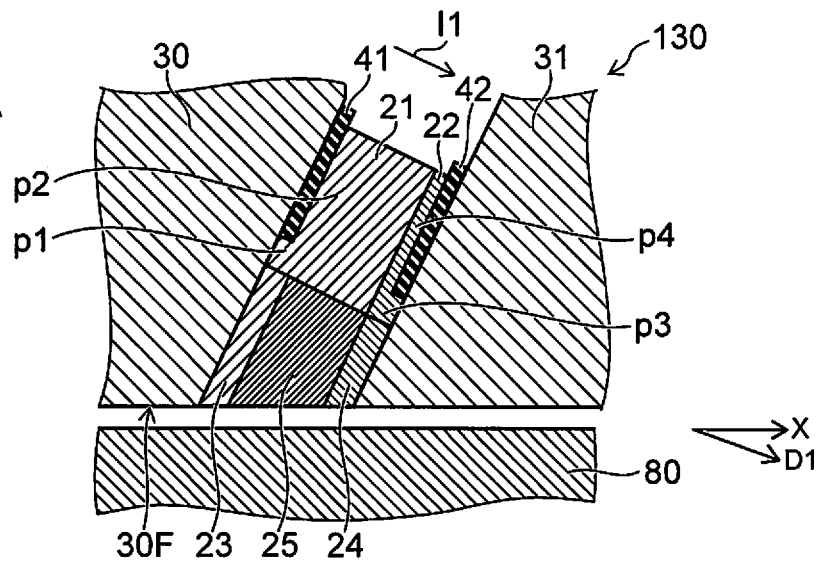
FIG. 7A to FIG. 7C are schematic cross-sectional views illustrating magnetic heads according to the first embodiment.
Figure 7B:
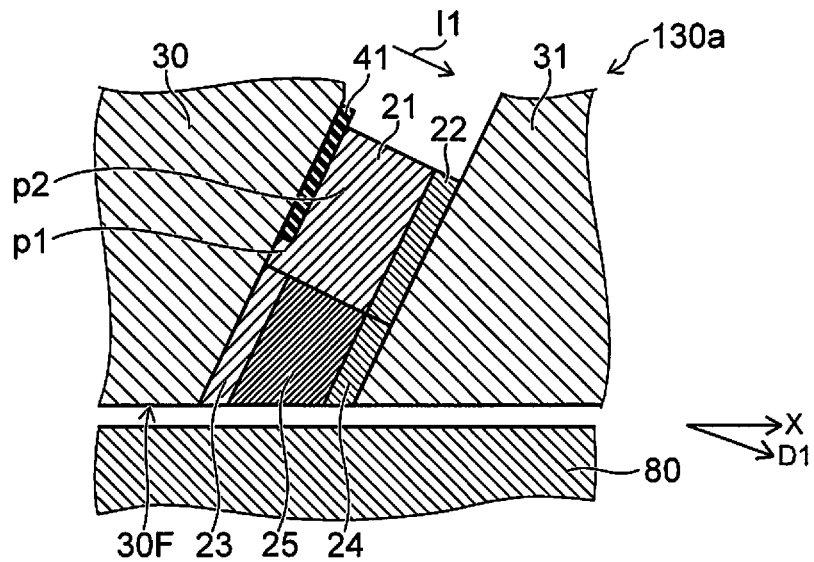
Figure 7C:
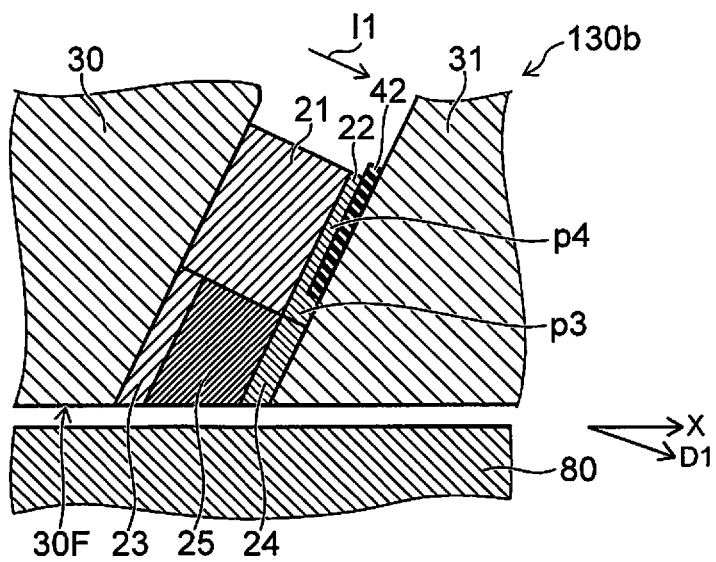

FIG. 7A to FIG. 7C are schematic cross-sectional views illustrating magnetic heads according to the first embodiment.

As shown in FIG. 7A, a magnetic head 130 according to the embodiment has the configuration of the magnetic head 120 in which a first insulating layer 41 and a second insulating layer 42 are further provided.

The first conductive layer 21 includes a first portion p1 and a second portion p2. The first insulating layer 41 is provided between the magnetic pole 30 and the second portion p2. The first portion p1 is provided between the first insulating layer 41 and the third conductive layer 23 in a direction crossing the first direction D1.

The second conductive layer 22 includes a third portion p3 and a fourth portion p4. The second insulating layer 42 is provided between the first shield 31 and the fourth portion p4. The third portion p3 is provided between the second insulating layer 42 and the fourth conductive layer 24 in a direction crossing the first direction D1.

For example, the first insulating layer 41 and the second insulating layer 42 function as current-limiting layers (current confinement layers). By providing these insulating layers, the first current I1 can flow efficiently in the third portion p3 and the first portion p1 proximal to the magnetic layer 25. For example, the magnetization 25M of the magnetic layer 25 can be reversed efficiently.

As in a magnetic head 130a shown in FIG. 7B, the first insulating layer 41 may be provided; and the second insulating layer 42 may be omitted. As in a magnetic head 130b shown in FIG. 7C, the second insulating layer 42 may be provided; and the first insulating layer 41 may be omitted.

FIG. 8A to FIG. 8C are schematic cross-sectional views illustrating magnetic heads according to the first embodiment.

As shown in FIG. 8A, a magnetic head 131 according to the embodiment has the configuration of the magnetic head 121 in which the first insulating layer 41 and the second insulating layer 42 are further provided.

The first conductive layer 21 includes the first portion p1 and the second portion p2. The first insulating layer 41 is provided between the second portion p2 and the first shield 31. The first portion p1 is provided between the first insulating layer 41 and the third conductive layer 23 in a direction crossing the first direction D1.

The second conductive layer 22 includes the third portion p3 and the fourth portion p4. The second insulating layer 42 is provided between the magnetic pole 30 and the fourth portion p4. The third portion p3 is provided between the second insulating layer 42 and the fourth conductive layer 24 in a direction crossing the first direction D1.

In such a case as well, for example, the first insulating layer 41 and the second insulating layer 42 function as current-limiting layers. The first current I1 flows efficiently in the third portion p3 and the first portion p1 proximal to the magnetic layer 25. For example, the magnetization 25M of the magnetic layer 25 can be reversed efficiently.

As in a magnetic head 131a shown in FIG. 8B, the first insulating layer 41 may be provided; and the second insulating layer 42 may be omitted. As in a magnetic head 131b shown in FIG. 8C, the second insulating layer 42 may be provided; and the first insulating layer 41 may be omitted.

FIG. 9A to FIG. 9D are schematic plan views illustrating magnetic heads according to the first embodiment.

For example, these drawings are plan views of the magnetic heads viewed along arrow AA shown in FIG. 1A (viewed from the magnetic pole surface 30F or the ABS). The second shield 32 and the insulating portions are not illustrated in these drawings.

In the magnetic heads 140 to 143 as shown in FIG. 9A to FIG. 9D, the direction from the first conductive layer 21 toward the magnetic layer 25 crosses the direction from the magnetic pole 30 toward the first shield 31. In the example, the direction from the first conductive layer 21 toward the magnetic layer 25 is aligned with the Y-axis direction. The direction from the first conductive layer 21 toward the magnetic layer 25 is aligned with the cross-track direction.

Figure 9A:
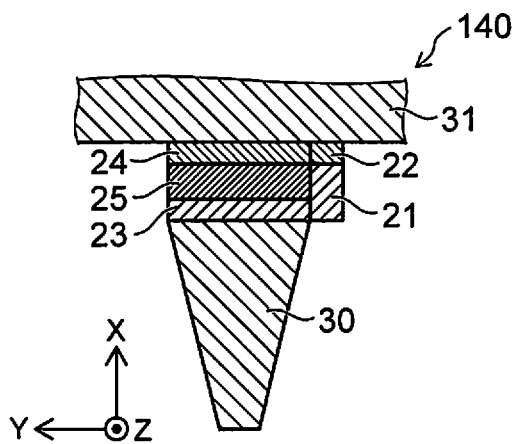
FIG. 9A to FIG. 9D are schematic plan views illustrating magnetic heads according to the first embodiment.
Figure 9B:
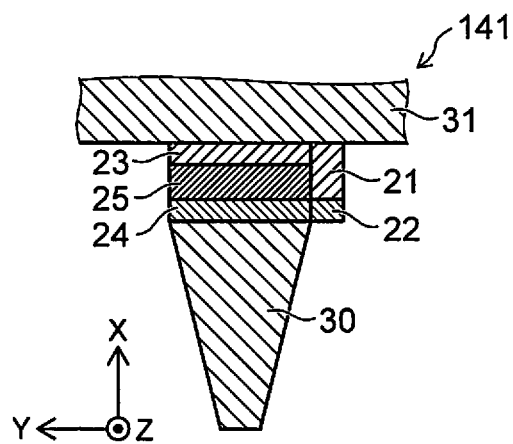

In the magnetic heads 140 and 141 as shown in FIG. 9A and FIG. 9B, the direction from a portion of the first conductive layer 21 toward the third conductive layer 23 is aligned with the Y-axis direction. The direction from the second conductive layer 22 toward the fourth conductive layer 24 is aligned with the Y-axis direction. A current that has the orientation from the first conductive layer 21 toward the second conductive layer 22 is supplied.

Figure 9C:
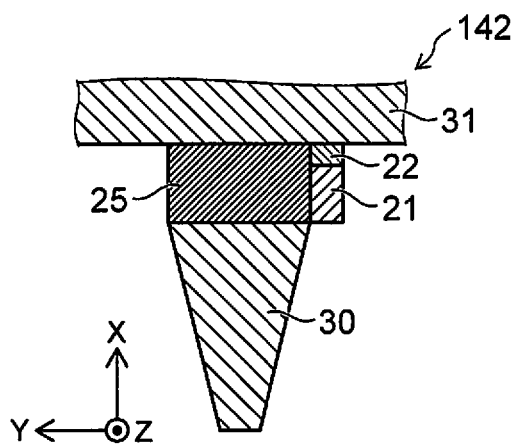
Figure 9D:
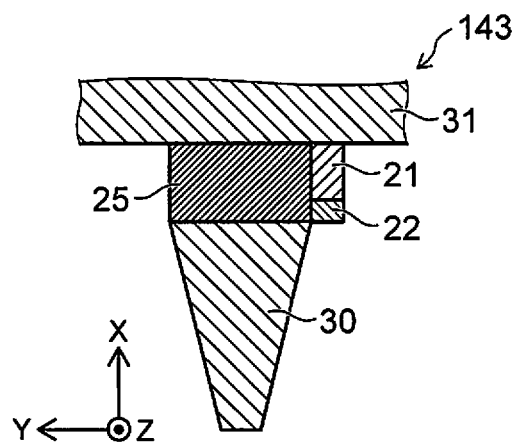

In the magnetic heads 142 and 143 as shown in FIG. 9C and FIG. 9D, the direction from the first conductive layer 21 toward the magnetic layer 25 is aligned with the Y-axis direction; and the direction from the second conductive layer 22 toward the magnetic layer 25 is aligned with the Y-axis direction. A current that has the orientation from the first conductive layer 21 toward the second conductive layer 22 is supplied.

Figure 10A:
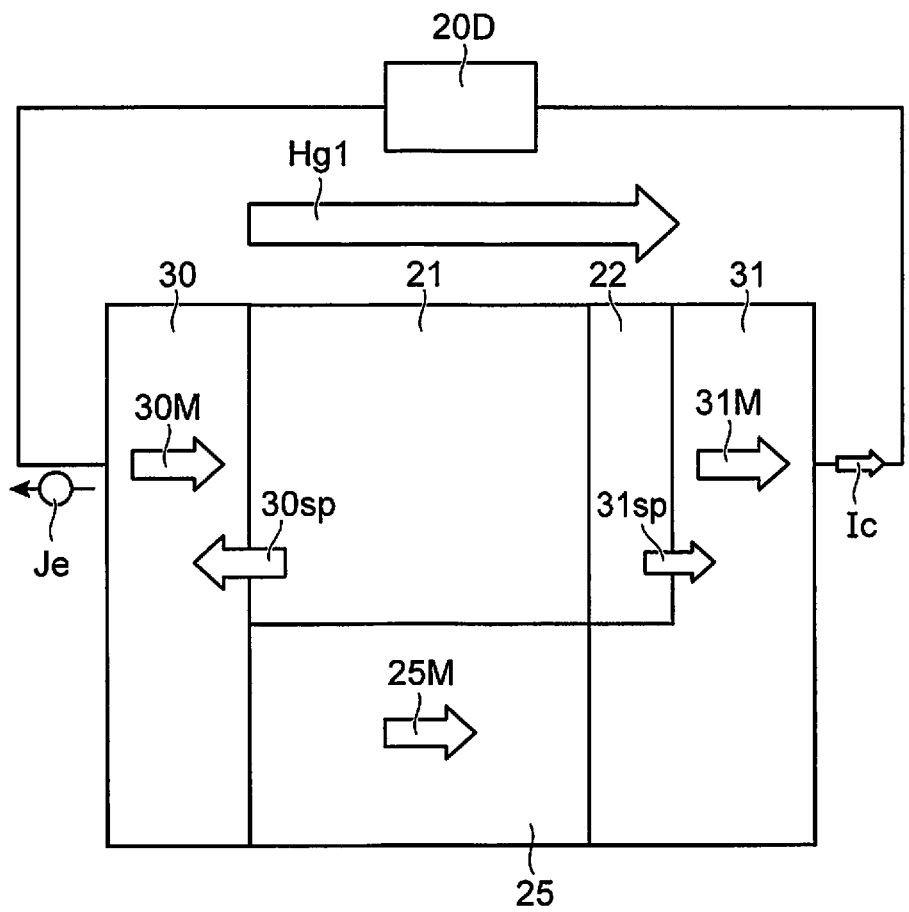
FIG. 10A and FIG. 10B are schematic views illustrating operations of magnetic heads according to the embodiment.
Figure 10B:
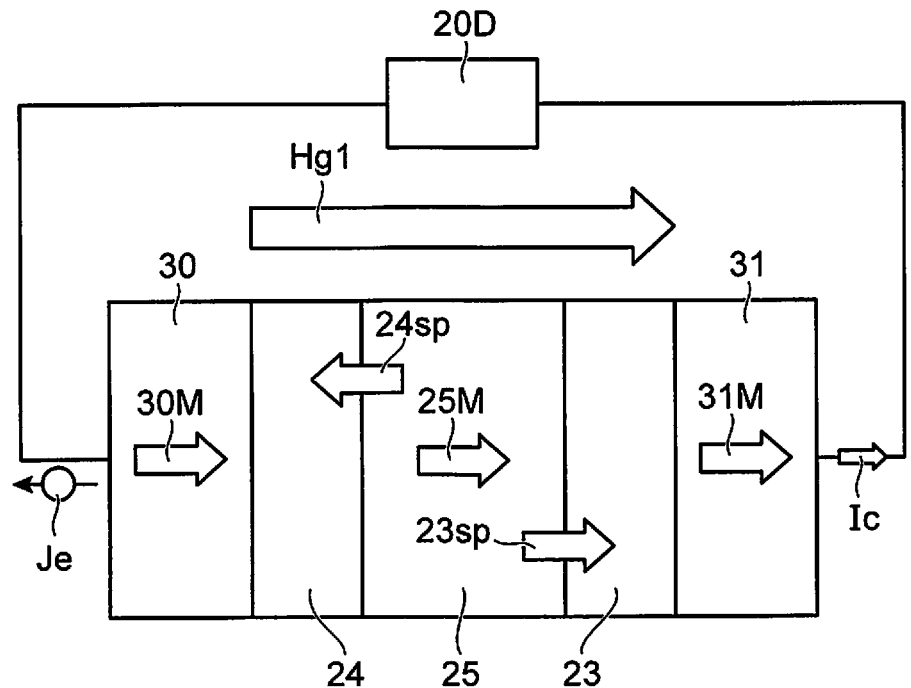

FIG. 10A and FIG. 10B are schematic views illustrating operations of magnetic heads according to the embodiment.

FIG. 10A shows an example of the magnetic effect of the first conductive layer 21, the magnetic layer 25, and the second conductive layer 22. FIG. 10B shows an example of the magnetic effect of the third conductive layer 23, the magnetic layer 25, and the fourth conductive layer 24.

As shown in FIG. 10A, the first conductive layer 21, the second conductive layer 22, and the magnetic layer 25 are provided between the magnetic pole 30 and the first shield 31.

The second electrical circuit 30D (referring to FIG. 1A) supplies the recording current to the coil 30c of the magnetic pole 30. Thereby, a gap magnetic field Hg1 is generated from the magnetic pole 30. The gap magnetic field Hg1 is applied to the first conductive layer 21, the second conductive layer 22, and the magnetic layer 25.

For example, a magnetization 30M of the magnetic pole 30 and a magnetization 31M of the first shield 31 are substantially parallel to the gap magnetic field Hg1. The magnetization 25M of the magnetic layer 25 is substantially parallel to the gap magnetic field Hg1 in the state before a current Ic (corresponding to the first current I1) flows.

The first electrical circuit 20D supplies the current Ic (corresponding to the first current I1). At this time, for example, the current Ic flows from the first conductive layer 21 toward the second conductive layer 22. At this time, an electron current Je flows. The electron current Je flows from the second conductive layer 22 toward the first conductive layer 21.

A spin torque 31sp is generated at the interface between the second conductive layer 22 and the first shield 31 by the electron current Je. The spin torque 31sp is, for example, transmissive. On the other hand, a spin torque 30sp is generated at the interface between the first conductive layer 21 and the magnetic pole 30 by the electron current Je. The spin torque 30sp is, for example, reflective. The spin torque 30sp is larger than the spin torque 31sp due to the difference between the materials of the first conductive layer 21 and the second conductive layer 22. These spin torques flow into the magnetic layer 25 by diffusion; and the magnetization 25M of the magnetic layer 25 changes. The magnetization 25M has a component having the reverse orientation of the gap magnetic field Hg1.

As shown in FIG. 10B, the third conductive layer 23, the magnetic layer 25, and the fourth conductive layer 24 are provided between the magnetic pole 30 and the first shield 31.

The second electrical circuit 30D (referring to FIG. 1A) supplies the recording current to the coil 30c of the magnetic pole 30. Thereby, the gap magnetic field Hg1 is generated from the magnetic pole 30. The gap magnetic field Hg1 is applied to the third conductive layer 23, the magnetic layer 25, and the fourth conductive layer 24.

For example, the magnetization 30M of the magnetic pole 30 and the magnetization 31M of the first shield 31 are substantially parallel to the gap magnetic field Hg1. The magnetization 25M of the magnetic layer 25 is substantially parallel to the gap magnetic field Hg1 in the state before the current Ic (corresponding to the first current I1) flows.

The current Ic (corresponding to the first current I1) is supplied from the first electrical circuit 20D. At this time, for example, the current Ic flows from the fourth conductive layer 24 toward the third conductive layer 23. At this time, the electron current Je flows. The electron current Je flows from the third conductive layer 23 toward the fourth conductive layer 24.

A spin torque 23sp is generated at the interface between the third conductive layer 23 and the magnetic layer 25 by the electron current Je. The spin torque 23sp is, for example, transmissive. On the other hand, a spin torque 24sp is generated at the interface between the magnetic layer 25 and the fourth conductive layer 24 by the electron current Je. The spin torque 24sp is, for example, reflective. The magnetization 25M of the magnetic layer 25 reverses due to these spin torques. The reversed magnetization 25M has a component having the reverse orientation of the gap magnetic field Hg1.

For example, the current Ic may flow from the third conductive layer 23 toward the fourth conductive layer 24. At this time, the orientation of the spin torque 23sp and the orientation of the spin torque 24sp shown in FIG. 10B reverse. At this time, the spin torque 23sp is reflective; and the spin torque 24sp is transmissive.

For example, the magnetization 25M of the magnetic layer 25 is reversed easily by appropriately controlling the spin torque 23sp and the spin torque 24sp.

For example, the fourth conductive layer 24 may include Ir. In such a case, the thickness (the length along the first direction D1) of the fourth conductive layer 24 is, for example, not less than 0.3 nm and not more than 0.8 nm. In such a case, antiferromagnetic coupling occurs easily. For example, the magnetic layer 25 and the first shield 31 are antiferromagnetically coupled in the example of FIG. 1B. The magnetization 25M reverses easily with respect to the magnetic field H2 from the magnetic pole 30.

Second Embodiment

A second embodiment relates to a magnetic memory device. The magnetic memory device according to the embodiment includes a magnetic head, the magnetic recording medium 80 (e.g., a recording medium disk 180 described below), and the first electrical circuit 20D (referring to FIG. 1A). Information is recorded in the magnetic recording medium by the magnetic head (the magnetic pole 30). Any magnetic head (the magnetic heads 110, 110a, 111, 111a, 120, 121, 130, 130a, 130b, 131, 131a, 131b, etc.) and the magnetic heads of the modifications according to the first embodiment may be used as the magnetic head of the second embodiment. The case will now be described where the magnetic head 110 is used.

As described above, the first electrical circuit 20D is configured to supply the first current I1 between the magnetic pole 30 and the first shield 31. The magnetic memory device according to the embodiment may further include the second electrical circuit 30D (referring to FIG. 1A). As described above, the second electrical circuit 30D is configured to supply, to the coil 30c, a current (a recording current) corresponding to the information to be recorded in the magnetic recording medium 80.

The magnetic head 110 may perform shingle recording to the magnetic recording medium 80. The recording density can be increased further.

An example of a magnetic recording and reproducing device according to the embodiment will now be described.

Figure 11:
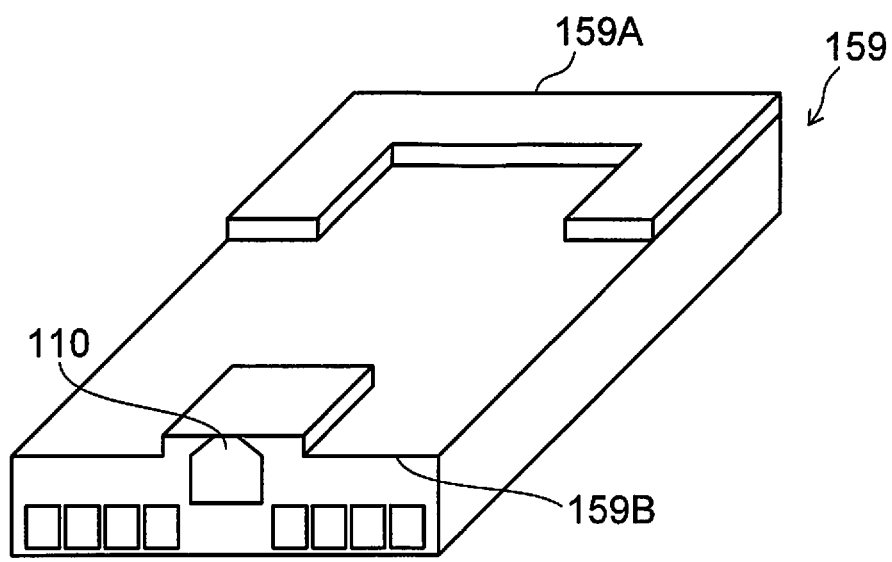
FIG. 11 is a schematic perspective view illustrating a portion of the magnetic recording and reproducing device according to the embodiment.

FIG. 11 is a schematic perspective view illustrating a portion of the magnetic recording and reproducing device according to the embodiment.

FIG. 11 illustrates a head slider.

The magnetic head 110 is provided in the head slider 159. The head slider 159 includes, for example, Al$_2$O$_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 12:
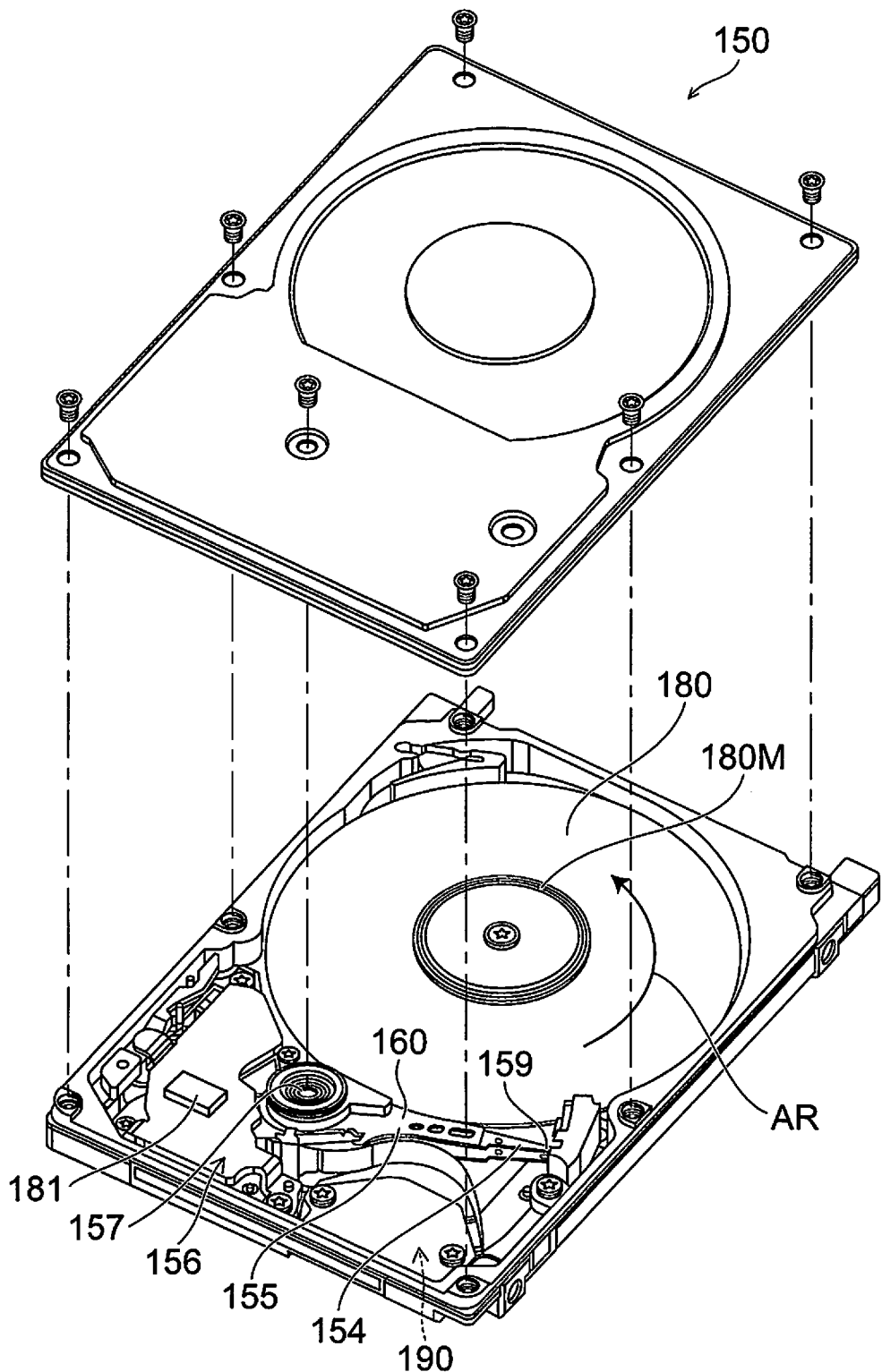
FIG. 12 is a schematic perspective view illustrating the magnetic recording and reproducing device according to the embodiment.

FIG. 12 is a schematic perspective view illustrating the magnetic recording and reproducing device according to the embodiment.

As shown in FIG. 12, a rotary actuator is used in the magnetic recording and reproducing device 150 according to the embodiment. The recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

Figure 13A:
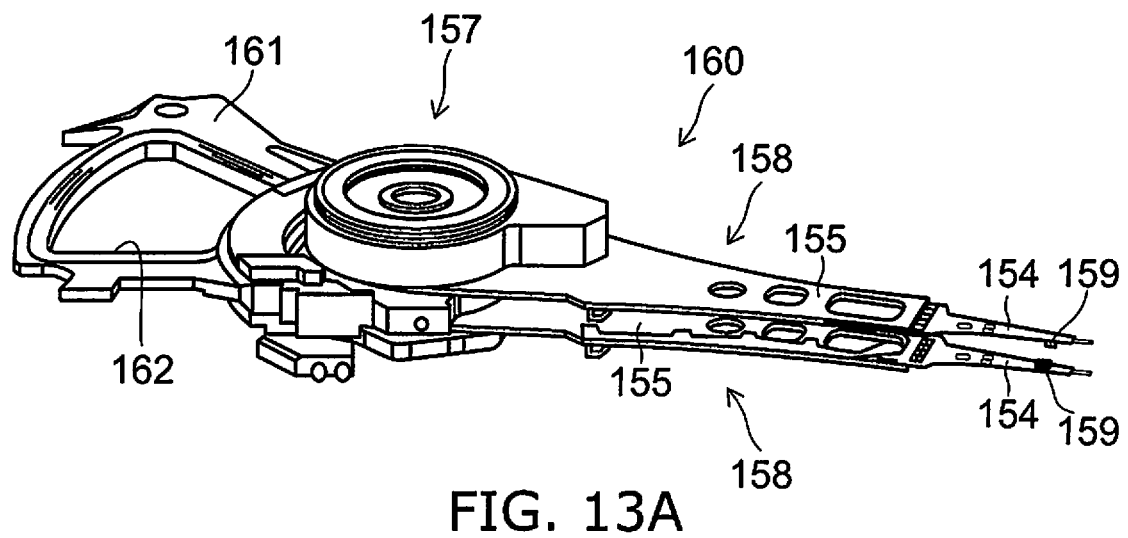
FIG. 13A and FIG. 13B are schematic perspective views illustrating a portion of the magnetic recording and reproducing device according to the embodiment.
Figure 13B:
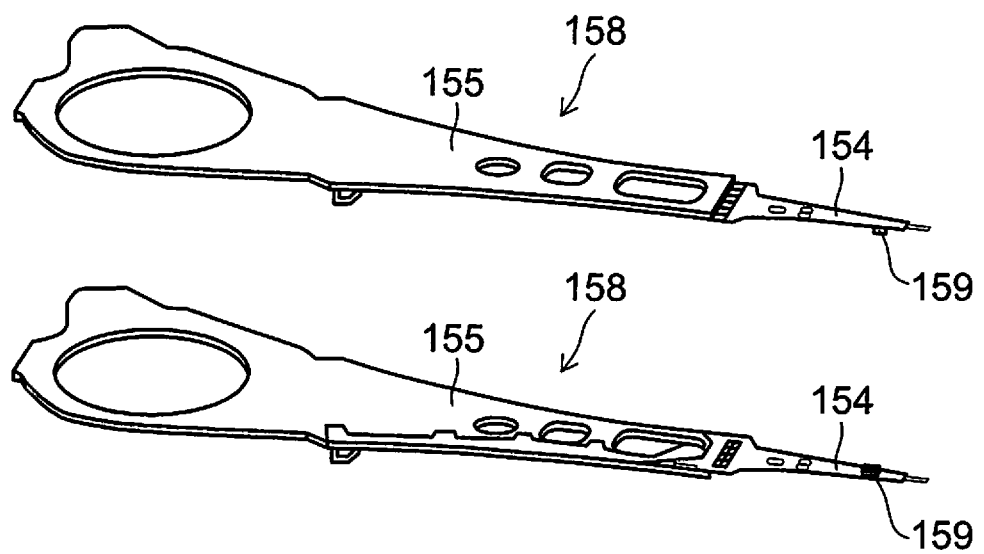

FIG. 13A and FIG. 13B are schematic perspective views illustrating a portion of the magnetic recording and reproducing device according to the embodiment.

FIG. 13A illustrates the configuration of a portion of the magnetic recording and reproducing device and is an enlarged perspective view of a head stack assembly 160. FIG. 13B is a perspective view illustrating a magnetic head assembly (head gimbal assembly (HGA)) 158 that is a portion of the head stack assembly 160.

As shown in FIG. 13A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends and the direction in which the head gimbal assembly 158 extends are reversed. The support frame 161 supports a coil 162 of the voice coil motor 156.

As shown in FIG. 13B, the head gimbal assembly 158 includes the arm 155 extending from the bearing part 157 and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using the magnetic head provided in the magnetic head assembly.

The embodiments may include the following configurations (e.g., technological proposals).

Configuration 1

A magnetic head, comprising:

a magnetic pole;

a first shield;

a magnetic layer provided between the magnetic pole and the first shield;

a first conductive layer including at least one selected from the group consisting of Cu, Ag, Au, Al and Cr, and being provided between the magnetic pole and the first shield, a direction from the first conductive layer toward the magnetic layer crossing a first direction from the magnetic pole toward the first shield; and a second conductive layer including at least one selected from the group consisting of Ta, Pt, W, Ru, Mo, Ir, Rh, and Pd and being provided at one of a first position or a second position, the first position being between the first conductive layer and the first shield, the second position being between the magnetic pole and the first conductive layer.

Configuration 2

The magnetic head according to Configuration 1, wherein the first conductive layer contacts the magnetic layer.

Configuration 3

The magnetic head according to Configuration 1 or 2, wherein the second conductive layer contacts the first conductive layer.

Configuration 4

The magnetic head according to any one of Configurations 1 to 3, wherein a current flows from the first conductive layer toward the second conductive layer.

Configuration 5

The magnetic head according to any one of Configurations 1 to 5, further comprising:

a first interconnect electrically connected to the magnetic pole; and a second interconnect electrically connected to the first shield.

Configuration 6

The magnetic head according to any one of Configurations 1 to 3, wherein the first conductive layer and the second conductive layer are electrically connected to the magnetic pole and the first shield.

Configuration 7

The magnetic head according to Configuration 6, wherein the second conductive layer is provided at the first position, and a current having an orientation from the magnetic pole toward the first shield flows through the first conductive layer, the magnetic layer, and the second conductive layer.

Configuration 8

The magnetic head according to Configuration 6, wherein the second conductive layer is provided at the second position, and a current having an orientation from the first shield toward the magnetic pole flows through the first conductive layer, the magnetic layer, and the second conductive layer.

Configuration 9

The magnetic head according to any one of Configurations 1 to 6, further comprising:

a third conductive layer provided between the magnetic pole and the magnetic layer, the third conductive layer being nonmagnetic; and a fourth conductive layer provided between the magnetic layer and the first shield, the fourth conductive layer being nonmagnetic, the second conductive layer being provided at the first position, the third conductive layer including at least one selected from the group consisting of Cu, Ag, Au, Al and Cr, the fourth conductive layer including at least one selected from the group consisting of Ta, Pt, W, Ru, Mo, Ir, Rh, and Pd.

Configuration 10

The magnetic head according to Configuration 9, wherein the third conductive layer contacts the magnetic pole and the magnetic layer, and the fourth conductive layer contacts the magnetic layer and the first shield.

Configuration 11

The magnetic head according to Configuration 9 or 10, further comprising a first insulating layer, the first conductive layer including a first portion and a second portion, the first insulating layer being provided between the magnetic pole and the second portion, the first portion being provided between the first insulating layer and the third conductive layer in a direction crossing the first direction.

Configuration 12

The magnetic head according to any one of Configurations 9 to 11, further comprising a second insulating layer, the second conductive layer including a third portion and a fourth portion, the second insulating layer being provided between the first shield and the fourth portion, the third portion being provided between the second insulating layer and the fourth conductive layer in the direction crossing the first direction.

Configuration 13

The magnetic head according to any one of Configurations 1 to 6, further comprising:

a third conductive layer provided between the magnetic layer and the first shield, the third conductive layer being nonmagnetic; and a fourth conductive layer provided between the magnetic pole and the magnetic layer, the fourth conductive layer being nonmagnetic, the second conductive layer being provided at the second position, the third conductive layer including at least one selected from the group consisting of Cu, Ag, Au, Al and Cr, the fourth conductive layer including at least one selected from the group consisting of Ta, Pt, W, Ru, Mo, Ir, Rh, and Pd.

Configuration 14

The magnetic head according to Configuration 13, wherein the third conductive layer contacts the magnetic layer and the first shield, and the fourth conductive layer contacts the magnetic pole and the magnetic layer.

Configuration 15

The magnetic head according to Configuration 13 or 14, further comprising a first insulating layer, the first conductive layer including a first portion and a second portion, the first insulating layer being provided between the first shield and the second portion, the first portion being provided between the first insulating layer and the third conductive layer in a direction crossing the first direction.

Configuration 16

The magnetic head according to any one of Configurations 13 to 15, further comprising a second insulating layer, the second conductive layer including a third portion and a fourth portion, the second insulating layer being provided between the magnetic pole and the fourth portion, the third portion being provided between the second insulating layer and the fourth conductive layer in the direction crossing the first direction.

Configuration 17

The magnetic head according to any one of Configurations 9 to 16, wherein the fourth conductive layer includes Ir, and a thickness along the first direction of the fourth conductive layer is not less than 0.3 nm and not more than 0.8 nm.

Configuration 18

A magnetic recording and reproducing device, comprising:

the magnetic head according to any one of Configurations 1 to 17;

a magnetic recording medium, information being recorded in the magnetic recording medium by the magnetic head; and a first electrical circuit configured to supply a current between the magnetic pole and the first shield.

Configuration 19

The magnetic recording and reproducing device according to Configuration 18, wherein the magnetic head performs at least shingle recording to the magnetic recording medium.

Configuration 20

The magnetic recording and reproducing device according to Configuration 18 or 19, further comprising a second electrical circuit, the magnetic head further including a coil, at least a portion of the coil being positioned between the magnetic pole and the first shield, the second electrical circuit being configured to supply, to the coil, a current corresponding to the information.

According to the embodiments, a magnetic head and a magnetic recording and reproducing device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, magnetic layers, conductive layers, insulating layers, interconnects, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording and reproducing devices practicable by an appropriate design modification by one skilled in the art based on the magnetic heads, and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
    a magnetic pole;
    a first shield;
    a magnetic layer provided between the magnetic pole and the first shield;
    a first conductive layer including at least one selected from the group consisting of Cu, Ag, Au, Al and Cr and being provided between the magnetic pole and the first shield, a direction from the first conductive layer toward the magnetic layer crossing a first direction from the magnetic pole toward the first shield; and
    a second conductive layer including at least one selected from the group consisting of Ta, Pt, W, Ru, Mo, Ir, Rh, and Pd and being provided at one of a first position or a second position, the first position being between the first conductive layer and the first shield, the second position being between the magnetic pole and the first conductive layer;
    wherein the second conductive layer contacts the first conductive layer.

2. The head according to claim 1, wherein the first conductive layer contacts the magnetic layer.

3. The head according to claim 1, wherein a current flows from the first conductive layer toward the second conductive layer.

4. The head according to claim 1, further comprising:
    a first interconnect electrically connected to the magnetic pole; and
    a second interconnect electrically connected to the first shield.

5. The head according to claim 1, wherein the first conductive layer and the second conductive layer are electrically connected to the magnetic pole and the first shield.

6. The head according to claim 5, wherein
the second conductive layer is provided at the first position, and
a current having an orientation from the magnetic pole toward the first shield flows through the first conductive layer, the magnetic layer, and the second conductive layer.

7. The head according to claim 5, wherein
the second conductive layer is provided at the second position, and
a current having an orientation from the first shield toward the magnetic pole flows through the first conductive layer, the magnetic layer, and the second conductive layer.

8. The head according to claim 1, further comprising:
a third conductive layer provided between the magnetic pole and the magnetic layer, the third conductive layer being nonmagnetic; and
a fourth conductive layer provided between the magnetic layer and the first shield, the fourth conductive layer being nonmagnetic,
the second conductive layer being provided at the first position,
the third conductive layer including at least one selected from the group consisting of Cu, Ag, Au, Al and Cr,
the fourth conductive layer including at least one selected from the group consisting of Ta, Pt, W, Ru, Mo, Ir, Rh, and Pd.

9. The head according to claim 8, wherein
the third conductive layer contacts the magnetic pole and the magnetic layer, and
the fourth conductive layer contacts the magnetic layer and the first shield.

10. The head according to claim 8, further comprising a first insulating layer,
the first conductive layer including a first portion and a second portion,
the first insulating layer being provided between the magnetic pole and the second portion,
the first portion being provided between the first insulating layer and the third conductive layer in a direction crossing the first direction.

11. The head according to claim 8, further comprising a second insulating layer,
the second conductive layer including a third portion and a fourth portion,
the second insulating layer being provided between the first shield and the fourth portion,
the third portion being provided between the second insulating layer and the fourth conductive layer in a direction crossing the first direction.

12. The head according to claim 8, wherein
the fourth conductive layer includes Ir, and
a thickness along the first direction of the fourth conductive layer is not less than 0.3 nm and not more than 0.8 nm.

13. A magnetic recording and reproducing device, comprising:
the magnetic head according to claim 1;
a magnetic recording medium, information being recorded in the magnetic recording medium by the magnetic head; and
a first electrical circuit configured to supply a current between the magnetic pole and the first shield.

14. The device according to claim 13, wherein the magnetic head performs at least shingle recording to the magnetic recording medium.

15. The device according to claim 13, further comprising a second electrical circuit,
the magnetic head further including a coil,
at least a portion of the coil being positioned between the magnetic pole and the first shield,
the second electrical circuit being configured to supply, to the coil, a current corresponding to the information.

16. A magnetic head, comprising:
a magnetic pole;
a first shield;
a magnetic layer provided between the magnetic pole and the first shield;
a first conductive layer including at least one selected from the group consisting of Cu, Ag, Au, Al and Cr and being provided between the magnetic pole and the first shield, a direction from the first conductive layer toward the magnetic layer crossing a first direction from the magnetic pole toward the first shield;
a second conductive layer including at least one selected from the group consisting of Ta, Pt, W, Ru, Mo, Ir, Rh, and Pd and being provided at a position between the magnetic pole and the first conductive layer;
a third conductive layer provided between the magnetic layer and the first shield, the third conductive layer being nonmagnetic; and
a fourth conductive layer provided between the magnetic pole and the magnetic layer, the fourth conductive layer being nonmagnetic,
the third conductive layer including at least one selected from the group consisting of Cu, Ag, Au, Al and Cr,
the fourth conductive layer including at least one selected from the group consisting of Ta, Pt, W, Ru, Mo, Ir, Rh, and Pd.

17. The head according to claim 16, wherein
the third conductive layer contacts the magnetic layer and the first shield, and
the fourth conductive layer contacts the magnetic pole and the magnetic layer.

18. The head according to claim 16, further comprising a first insulating layer,
the first conductive layer including a first portion and a second portion,
the first insulating layer being provided between the first shield and the second portion,
the first portion being provided between the first insulating layer and the third conductive layer in a direction crossing the first direction.

19. The head according to claim 16, further comprising a second insulating layer,
the second conductive layer including a third portion and a fourth portion,
the second insulating layer being provided between the magnetic pole and the fourth portion,
the third portion being provided between the second insulating layer and the fourth conductive layer in a direction crossing the first direction.

* * * * *